(12) United States Patent
Wei et al.

(10) Patent No.: US 12,185,156 B2
(45) Date of Patent: Dec. 31, 2024

(54) METHOD AND APPARATUS FOR ADJUSTING QoS OF A QoS FLOW BASED ON ASSISTANCE INFORMATION

(71) Applicant: Huawei Technologies Co., Ltd., Shenzhen (CN)

(72) Inventors: Qing Wei, Munich (DE); Emmanouil Pateromichelakis, Munich (DE); Riccardo Trivisonno, Munich (DE); Apostolos Kousaridas, Munich (DE); Henrik Olofsson, Kista (SE); Mirko Schramm, Berlin (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 17/590,595

(22) Filed: Feb. 1, 2022

(65) Prior Publication Data
US 2022/0159504 A1 May 19, 2022

Related U.S. Application Data

(63) Continuation of application No. PCT/EP2020/067319, filed on Jun. 22, 2020.

(30) Foreign Application Priority Data

Aug. 2, 2019 (WO) ................. PCT/EP2019/070922

(51) Int. Cl.
*H04W 28/02* (2009.01)
(52) U.S. Cl.
CPC .............................. *H04W 28/0268* (2013.01)
(58) Field of Classification Search
None
See application file for complete search history.

(56) References Cited

U.S. PATENT DOCUMENTS

| 2009/0077256 A1* | 3/2009 | Madan ................... H04L 65/80 709/231 |
| 2011/0208853 A1* | 8/2011 | Castro-Castro ......... H04W 4/24 709/223 |
| 2019/0029057 A1* | 1/2019 | Pan ....................... H04W 76/10 |

FOREIGN PATENT DOCUMENTS

| WO | WO2006079802 | * | 3/2006 |
| WO | 2006079802 A1 | | 8/2006 |

(Continued)

OTHER PUBLICATIONS

Catt, "Discusstion on Automatic GBR service recovery," 3GPP TSG-RAN WG3 #103bis, Xi'an, 3GPP Draft; Mar. 30, 2019, XP051694961, R3-191507, total 2 pages, 3rd Generation Partnership Project, Valbonne, France (Apr. 8-12, 2019).

(Continued)

*Primary Examiner* — Andre Tacdiran
(74) *Attorney, Agent, or Firm* — Leydig, Voit & Mayer, Ltd.

(57) ABSTRACT

An entity, particularly a Radio Access Network (RAN) entity, adjusts Quality of Service (QoS) of at least one QoS flow in a RAN. The entity is configured to: obtain assistance information for an adjustment of at least one QoS profile for the at least one QoS flow of at least one wireless communication device, particularly of at least one user equipment (UE); and provide, to a second entity, particularly to a Core Network (CN) entity, a request for an adjustment or QoS information for the adjustment from a first QoS profile to a second QoS profile of a first QoS flow. The request or the QoS information is based on the assistance information.

22 Claims, 12 Drawing Sheets

(56) References Cited

FOREIGN PATENT DOCUMENTS

| WO | 2019158218 A1 | 8/2019 |
|---|---|---|
| WO | 2019158220 A1 | 8/2019 |

OTHER PUBLICATIONS

"3rd Generation Partnership Project;Technical Specification Group Services and System Aspects;Application layer support for Vehicle-to-Everything (V2X) services;Functional architecture and information flows; (Release 16)," 3GPP TS 23.286 V16.0.0, total 60 pages, 3rd Generation Partnership Project, Valbonne, France (Jun. 2019).
Huawei et al., "QoS Handling for V2X Communication Over Uu Reference Point," SA WG2 Meeting #134, Sapporo, Japan, 3GPP Draft, Jun. 28, 2019, XP051756823, S2-1908226, total 4 pages.
"3rd Generation Partnership Project;Technical Specification Group Services and System Aspects;Architecture enhancements for 5G System (5GS) to supportVehicle-to-Everything (V2X) services(Release 16)," 3GPP TS 23.287 V1.1.0, total 50 pages, 3rd Generation Partnership Project, Valbonne, France (Jul. 2019).
Samsung, "NGAP pCR for TSC Assistance Information," 3GPP TSG-RAN WG3, Reno, USA, 3GPP Draft; R3-192656, May 3, 2019, XP051712854, total 10 pages (May 13-17, 2019).
"3rd Generation Partnership Project;Technical Specification Group Services and System Aspects;Service Enabler Architecture Layer for Verticals (SEAL);Functional architecture and information flows;(Release 16)," 3GPP TS 23.434 V16.0.0, total 112 pages, 3rd Generation Partnership Project, Valbonne, France (Jun. 2019).
Asustek, "Discussion on UE assistance information for SLRB configuration," 3GPP TSG-RAN WG2 Meeting #105bis, Xi'an, China, 3GPP Draft, Apr. 6, 2019, XP051701043, R2-1903702, total 4 pages, 3rd Generation Partnership Project, Valbonne, France (Apr. 8-12, 2019).
"3rd Generation Partnership Project;Technical Specification Group Services and System Aspects;System Architecture for the 5G System;Stage 2 (Release 16)," 3GPP TS 23.501 V16.1.0, total 368 pages, 3rd Generation Partnership Project, Valbonne, France (Jun. 2019).
"3rd Generation Partnership Project;Technical Specification Group Services and System Aspects;Policy and Charging Control Framework for the 5G System;Stage 2 (Release 16)," 3GPP TS 23.503 V16.1.0, total 99 pages, 3rd Generation Partnership Project, Valbonne, France (Jun. 2019).
"3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786 V16.1.0, total 119 pages, 3rd Generation Partnership Project, Valbonne, France (Jun. 2019).
"3rd Generation Partnership Project;Technical Specification Group Radio Access Network;Evolved Universal Terrestrial Radio Access (E-UTRA);Layer 2—Measurements (Release 8," 3GPP TS 36.314 V8.2.0, total 15 pages, 3rd Generation Partnership Project, Valbonne, France (Jun. 2009).
"3rd Generation Partnership Project; Technical Specification Group Radio Access Network; Study on RAN-centric data collection and utilization for LTE and NR (Release 16)," 3GPP TR 37.816 V16.0.0, total 35 pages, 3rd Generation Partnership Project, Valbonne, France (Jul. 2019).
"3rd Generation Partnership Project; Technical Specification Group Radio Access Network; NG-RAN; NG Application Protocol (NGAP)(Release 15)," 3GPP TS 38.413 V15.4.0, total 328 pages, 3rd Generation Partnership Project, Valbonne, France (Jul. 2019).
"3rd Generation Partnership Project; Technical Specification Group Radio Access Network; NG-RAN; Xn application protocol (XnAP)(Release 15)," 3GPP TS 38.423 V15.4.0, total 309 pages, 3rd Generation Partnership Project, Valbonne, France (Jul. 2019).
"Reply LS on QoS Support for eV2X over Uu interface," SA WG2 Meeting #S2-133, Reno, Nevada, USA, total 1 page, S2-1904893, 3rd Generation Partnership Project, Valbonne, France (May 13-17, 2019,).
EP/20733307, Office Action, Apr. 26, 2024.

* cited by examiner

METHOD AND APPARATUS FOR ADJUSTING QoS OF A QoS FLOW BASED ON ASSISTANCE INFORMATION

CROSS-REFERENCE TO RELATED APPLICATIONS

This application is a continuation of International Application No. PCT/EP2020/067319, filed on Jun. 22, 2020, which claims priority to International Patent Application No. PCT/EP2019/070922, filed on Aug. 2, 2019. The disclosures of the aforementioned applications are hereby incorporated by reference in their entireties.

TECHNICAL FIELD

The present disclosure relates to entities for a mobile network system, in particular, for a $4^{th}$ generation mobile or cellular communication system (4G system) or for a $5^{th}$ generation mobile or cellular communication system (5G system). The proposed entities and corresponding methods, according to embodiments of the disclosure, are configured to support multiple Quality of Service (QoS) levels for a communication session, i.e., for a QoS flow. The present disclosure is particularly concerned with the Radio Access Network (RAN) being enabled to decide, whether to adjust a QoS profile of the QoS flow, or to request adjustment of the QoS profile.

BACKGROUND

The concept of multiple QoS levels (multi-level QoS) has been introduced in TR 23.786 FS_eV2X as solution #27, and allows the usage of at least one alternative QoS profile in case a desired QoS profile for a QoS flow could not be fulfilled.

In comparison, in the 5G system, an Application Function (AF) may provide "Alternative Service Requirement(s)" in addition to a "Requested Service Requirement" to a Policy Control Function (PCF). If notification control is enabled, the PCF may include "Alternative QoS parameter set(s)" based on the Alternative Service Requirement(s) into a policy rule message sent to a Session Management Function (SMF). If notification control is enabled, the SMF may further derive "Alternative QoS profile(s)" based on the Alternative QoS parameter set(s), and send them to the NG-RAN (i.e., a RAN entity). When the RAN notifies a 5G Core (5GC) entity that the QoS characteristics cannot be fulfilled, the notification may include an alternative QoS profile, which can be supported in the notification.

In TR 23.786, Solution #27, a "Solution for QoS Support for eV2X over Uu Interface" was concluded to be taken into account for normative work. The Solution #27 defines the following: SMF sends multiple sets of QoS profiles to the NG-RAN (a RAN entity), which are marked as "Alternative" except for the target QoS Profile. The NG-RAN receives a N2 PDU Session Request for a QoS flow establishment, which contains the QoS profile in N2 Session Management (SM) Information from the SMF. If the NG-RAN supports the feature, the NG-RAN will also store the Alternative QoS profile(s).

If the NG-RAN cannot fulfil a Guaranteed Flow Bit Rate (GFBR) requirement, and/or Packet Delay Budget (PDB) requirement, and/or Packet Error Rate (PER) requirement, of the QoS profile, it notifies the 5GC using the procedure as specified in clause 5.7.2.4 of TS 23.501, and then further notifies the AF (e.g., a Vehicle-to-Everything (V2X) application). For example, the AF obtain this information from the PCF via a Network Exposure Function (NEF).

If the Alternative QoS profile(s) are received in addition to the notification to the 5GC and to the V2X application that the QoS targets cannot be fulfilled, the NG-RAN, when supporting the feature, checks if any of the alternative QoS profile(s) could be supported. If the NG-RAN can support one of the alternative QoS profile(s), the NG-RAN may include its associated index in the notification, so that the 5GC and the V2X application can take this information into account.

If none of the alternative QoS profile(s) are applicable, the NG-RAN may provide the information about what QoS characteristics cannot be fulfilled, including the current 'QoS requirements that are guaranteed' (e.g., GFBR, PDB and/or PER), using the procedure as specified in clause 5.7.2.4 of TS 23.501, and then further notify the AF, if a notification is required, so that the V2X application can take this information into account and take proper action.

The NG-RAN still tries to fulfil the original QoS target after sending the notification.

When a radio condition changes, and the requirement of GFBR, PDB and PER of the QoS profile can be fulfilled again, the NG-RAN notifies the 5GC using the procedure as specified in clause 5.7.2.4 of TS 23.501 and then further the AF (e.g., the V2X application). The V2X application then takes proper action based on information provided by the $3^{rd}$ Generation Partnership Project (3GPP) system and other sources if available.

SUMMARY

Embodiments of the present disclosure base on the following further considerations. In particular, the above-described Solution #27 has been specified based on the following two cases.

Case 1 focuses on a method to enhance the AF capabilities to monitor and influence QoS, and enables the 5GS (including 5GC and RAN) to operate with multiple QoS profiles based on AF input. The method allows the AF to indicate multiple (e.g., two or more) QoS profiles that are regarded as suitable to support the relating application, and to be timely notified when the QoS profile is changed, or when the suitable QoS profiles cannot be any longer supported.

Case 2 focuses on methods and techniques for a mobile device (e.g., a vehicle), or an application server/AF/client that negotiates with a network entity to determine the QoS. A list of QoS classes is sent during the establishment of a connection or a new bearer establishment. During handover, a list of QoS classes is sent from the source to the target base station.

However, neither case 1 nor case 2 addresses how the RAN can evaluate, whether a QoS profile can be fulfilled, or cannot be fulfilled, or can be fulfilled again, particularly considering the QoS profile(s) from multiple QoS flows.

In view of this, embodiments of the present disclosure improve methods and entities for adjusting QoS, e.g., methods according to solution #27. For instance, a goal is that the RAN is enabled to decide, whether to adjust a QoS profile of a QoS flow, or whether to request and adjustment of the QoS flow, e.g., from the CN. Further, it is desired that the RAN is able to evaluate the fulfilment or un-fulfillment of one or more QoS profiles per each of one or more QoS flows, while taking into account the complexity for supporting this feature. In addition, the RAN should be able to dynamically adjust (i.e., upgrade and/or downgrade) the QoS for one or more flows, taking into account the available radio resource and traffic demand.

Embodiments of the present disclosure are as described in the enclosed independent claims. Advantageous implementations of the embodiments of the present disclosure are further defined in the dependent claims.

In particular, embodiments of the present disclosure propose a mechanism for QoS adjustment (e.g., upgrading and/or downgrading a QoS of a flow) in the RAN (NG-RAN), assuming that the multi-level QoS is supported. Further, embodiments of the present disclosure specify the signaling, which may be used between RAN, 5GC, Operations, Administration and Maintenance (OAM) and User Equipment (UE).

A first aspect of the present disclosure provides an entity, particularly a RAN entity, for adjusting QoS of at least one QoS flow in a RAN, wherein the entity is configured to: obtain assistance information for an adjustment of at least one QoS profile for the at least one QoS flow of at least one wireless communication device, particularly of at least one UE; and provide, to a second entity, particularly to a Core Network, CN, entity, a request for an adjustment or QoS information for the adjustment from a first QoS profile to a second QoS profile of a first QoS flow, wherein the request or the QoS information is based on the assistance information.

The entity of the first aspect, particularly being an entity in the RAN, may decide whether to adjust the QoS profile of the first QoS flow itself or not. This decision of the entity of the first aspect is supported by the assistance information, which the entity may receive from outside the RAN, e.g., from the CN. If the entity of the first aspect decides that it can adjust the QoS profile itself, it may perform the QoS profile adjustment. Further, in this case it may send the QoS information to the second entity. The QoS information may be a report about the QoS profile adjustment performed by the entity of the first aspect. If the entity of the first aspect decides that it cannot, or does not want to, adjust the QoS profile itself, it may send the request to the second entity. The second entity, which may be a network entity like a CN entity, may then further decide whether it adjusts the QoS profile itself, or how to proceed with the QoS profile adjustment request.

Notably, a QoS flow may be referred to as a communication session in this disclosure. Further, the entity of the first aspect may be a RAN entity of a 4G or 5G system, e.g., a base station in the RAN/NG-RAN of these systems.

In an implementation of the first aspect, the entity is further configured to: provide, to the second entity, a further request for an adjustment or further QoS information for the adjustment from a first QoS profile to a second QoS profile of a second QoS flow, wherein the further request or further QoS information is based on the assistance information.

Thus, the entity of the first aspect may also decide about the QoS profile adjustment of the second QoS flow, similar as for the first QoS flow. Depending on the outcome of its decision to adjust the QoS profile for the second QoS flow itself or not, it may send the further request or further QoS information (further report).

In an implementation of the first aspect, the assistance information is provided for at least one packet data unit (PDU) session, for at least one QoS profile, for at least one QoS flow, for at least one wireless communication device, and/or for at least one RAN entity.

It is also possible to provide separate assistance information per PDU session, and/or per QoS profile, and/or per QoS flow, and/or per wireless communication device, and/or per RAN entity.

In an implementation of the first aspect, the assistance information comprises at least one of: an identification (ID) of at least one PDU session; an ID of the at least one QoS profile; an ID of the at least one wireless communication device; an ID of at least one QoS flow.

In an implementation of the first aspect, the assistance information comprises at least one of: an indication on whether or not to perform the adjustment by the entity; an indication of the priorities of the adjustment of the at least one QoS profile; timing information related to a temporal validity and/or periodicity of evaluation for the adjustment of the at least one QoS profile; area information indicating an area, in which the evaluation for the adjustment of the at least one QoS profile applies; event information indicating an event, in which the evaluation starts and/or ends and/or suspends and/or resumes; a resource requirement of the at least one QoS profile.

With this assistance information, the entity of the first aspect is supported in taking the decision, whether to adjust the QoS profile of the at least one QoS flow itself or not.

In an implementation of the first aspect, the assistance information comprises at least one of: cost information for enabling the entity to provide the request or the QoS information.

The cost information can be used by the entity of the first aspect to decide whether to adjust the QoS profile (either itself or not, i.e., in the latter case to rather request a decision from the second entity). For instance, if the cost information indicates a cost for adjusting the QoS profile that is below a certain cost threshold, the entity of the first aspect may decide that the QoS profile should be adjusted. It then either adjusts the QoS profile itself considering the cost, or request the second entity for the adjustment based on the cost (the cost can be included in the request).

In an implementation of the first aspect, the adjustment from the first QoS profile to the second QoS profile comprises at least one of the following: an upgrade to a better or more desired QoS profile for the at least one QoS flow; a downgrade to a worse or less desired QoS profile for the at least one QoS flow.

For instance, an original QoS profile of a QoS flow may be changed/upgraded/downgraded to an alternative QoS profile specified for the QoS flow. This may be done per QoS flow.

In an implementation of the first aspect, the entity is further configured to perform the adjustment from the first QoS profile to the second QoS profile, and provide the QoS information to the second entity.

In this case, the entity decided to carry out the adjustment of the QoS profile itself, the decision being based on the assistance information.

In an implementation of the first aspect, the QoS information comprises a result of the adjustment.

For instance, the new QoS profile may be indicated to the second entity. In addition, a cost of changing the QoS profile may be indicated.

In an implementation of the first aspect, the adjustment from the first QoS profile to the second QoS profile is based on the obtained assistance information and/or an evaluation of the RAN capability for supporting the adjustment for the at least one QoS flow.

In an implementation of the first aspect, the entity is further configured to: perform the evaluation of the RAN capability for supporting the adjustment for the at least one QoS flow; and decide whether to perform the adjustment from the first QoS profile to the second QoS profile based on a result of the evaluation.

The entity of the first aspect may decide whether to adjust the QoS profile itself based further on evaluating the fulfilment or un-fulfillment of one or more QoS profiles per QoS flow, while taking into account the complexity involved in the QoS profile adjustment.

In an implementation of the first aspect, the evaluation of whether the RAN can support the adjustment of the at least one QoS profile is based on aperiodic or periodic monitoring of a real-time actual or expected radio resource quality, a traffic load, and/or a resource availability for the at least one QoS profile, in particular for at least one alternative QoS profile and current QoS profile, based on the obtained assistance information.

In an implementation of the first aspect, the evaluation of whether the RAN can support the adjustment of the at least one QoS profile is triggered by a handover and/or by a handover request message.

In this case, the wireless communication device, particularly the UE, may leave or join a cell that is associated with the entity of the first aspect, e.g., a cell that is covered by the entity of the first aspect if it is a base station. The QoS profile in the other cell, i.e., the cell from which the wireless configuration device is handed over, may be different, e.g., may be such that it is not (likewise) supported in the cell of the entity of the first aspect. In another case, the cell of the entity of the first aspect may support a desired QoS profile for at least one QoS flow of the wireless communication device, which was not supported in the other cell. In both case, the QoS profile may be adjusted by the entity of the first aspect, itself or upon request.

In an implementation of the first aspect, the evaluation of whether the RAN can support the adjustment of the at least one QoS profile is a Radio Resource Control (RRC) functionality and/or a Radio Resource Management (RRM) functionality.

In an implementation of the first aspect, the entity is further configured to: not perform the adjustment from the first QoS profile to the second QoS profile itself, and provide the request to the second entity.

The second entity, e.g., being a CN entity, may then decide how to proceed and whether to adjust the QoS profile itself. It may also instruct the entity of the first aspect to perform the QoS profile adjustment.

In an implementation of the first aspect, the request comprises the result of the evaluation.

Thus, the second entity is provided with more relevant information for taking the decision of adjusting the QoS profile.

In an implementation of the first aspect, the assistance information is obtained from a network entity and/or a network management entity and/or an application entity.

In an implementation of the first aspect, the request or the QoS information comprises at least one of: an indication of whether at least one QoS profile has been changed; a new or a potential or a desired QoS profile based on the adjustment of a QoS flow; a cost information; a priority of the adjustment of at least one QoS profile.

A second aspect of the present disclosure provides an entity for support of adjusting QoS of at least one QoS flow in a RAN, the entity being configured to: provide assistance information for an adjustment of at least one QoS profile for the at least one QoS flow of at least one wireless communication device, particularly of at least one UE; and/or obtain a request for an adjustment or QoS information for the adjustment from a first QoS profile to a second QoS profile of a first QoS flow, wherein the request or QoS information is based on the assistance information.

Thus, the entity of the second aspect may support another entity, e.g., the entity of the first aspect in adjusting the QoS. For example, it may provide the assistance information to the entity of the first aspect, based on which the entity of the first aspect then decides to adjust the QoS or not. The entity of the second aspect may also receive the request or the QoS information from the entity of the first aspect, and may decide based thereon how to proceed with the QoS profile adjustment.

In an implementation of the first aspect, the entity is a network entity, a network management entity, or an application entity.

A third aspect of the present disclosure provides a method for adjusting QoS of at least one QoS flow in a RAN, the method comprising: obtaining assistance information for an adjustment of at least one QoS profile for the at least one QoS flow of at least one wireless communication device, particularly of at least one UE; and providing a request for an adjustment or QoS information for the adjustment from a first QoS profile to a second QoS profile of a first QoS flow, wherein the request or QoS information is based on the assistance information.

In an implementation of the third aspect, method further comprises: providing, to the second entity, a further request for an adjustment or further QoS information for the adjustment from a first QoS profile to a second QoS profile of a second QoS flow, wherein the further request or further QoS information is based on the assistance information.

In an implementation of the third aspect, the assistance information is provided for at least one packet data unit (PDU) session, for at least one QoS profile, for at least one QoS flow, for at least one wireless communication device, and/or for at least one RAN entity.

In an implementation of the third aspect, the assistance information comprises at least one of: an identification, ID, of at least one PDU session; an ID of the at least one QoS profile; an ID of the at least one wireless communication device; an ID of at least one QoS flow.

In an implementation of the third aspect, the assistance information comprises at least one of: an indication on whether or not to perform the adjustment by the entity; an indication of the priorities of the adjustment of the at least one QoS profile; timing information related to a temporal validity and/or periodicity of evaluation for the adjustment of the at least one QoS profile; area information indicating an area, in which the evaluation for the adjustment of the at least one QoS profile applies; event information indicating an event, in which the evaluation starts and/or ends and/or suspends and/or resumes; a resource requirement of the at least one QoS profile.

In an implementation of the third aspect, the assistance information comprises at least one of: cost information for enabling the entity to provide the request or the QoS information.

In an implementation of the third aspect, the adjustment from the first QoS profile to the second QoS profile comprises at least one of the following: an upgrade to a better or more desired QoS profile for the at least one QoS flow; a downgrade to a worse or less desired QoS profile for the at least one QoS flow.

In an implementation of the third aspect, method further comprises performing the adjustment from the first QoS profile to the second QoS profile, and providing the QoS information to the second entity.

In an implementation of the third aspect, the QoS information comprises a result of the adjustment.

In an implementation of the third aspect, the adjustment from the first QoS profile to the second QoS profile is based on the obtained assistance information and/or an evaluation of the RAN capability for supporting the adjustment for the at least one QoS flow.

In an implementation of the third aspect, the method further comprises: performing the evaluation of the RAN capability for supporting the adjustment for the at least one QoS flow; and deciding whether to perform the adjustment from the first QoS profile to the second QoS profile based on a result of the evaluation.

In an implementation of the third aspect, the evaluation of whether the RAN can support the adjustment of the at least one QoS profile is based on aperiodic or periodic monitoring of a real-time actual or expected radio resource quality, a traffic load, and/or a resource availability for the at least one QoS profile, in particular for at least one alternative QoS profile and current QoS profile, based on the obtained assistance information.

In an implementation of the third aspect, the evaluation of whether the RAN can support the adjustment of the at least one QoS profile is triggered by a handover and/or by a handover request message.

In an implementation of the third aspect, the evaluation of whether the RAN can support the adjustment of the at least one QoS profile is a RRC functionality and/or a RRM functionality In an implementation of the third aspect, the entity is further configured to: not perform the adjustment from the first QoS profile to the second QoS profile itself, and provide the request to the second entity.

In an implementation of the third aspect, the request comprises the result of the evaluation.

In an implementation of the third aspect, the assistance information is obtained from a network entity and/or a network management entity and/or an application entity.

In an implementation of the third aspect, the request or the QoS information comprises at least one of: an indication of whether at least one QoS profile has been changed; a new or a potential or a desired QoS profile based on the adjustment of a QoS flow; a cost information; a priority of the adjustment of at least one QoS profile.

The method of the third aspect and its implementations achieve the same advantages and effects as described for the entity of the first aspect and its respective implementations.

A fourth aspect of the present disclosure provides a computer program, wherein when the computer program runs on a computer, the computer performs the method according to the third aspect or any of its implementations.

A fifth aspect of the present disclosure provides a non-transitory storage medium storing executable program code which, when executed by a processor, causes the method according to the third aspect or any of its implementations to be performed.

A sixth aspect of the present disclosure provides an entity for adjusting the QoS of at least one communication session in the RAN, the entity being configured to: obtain assistance information for the adjustment of at least one QoS profile for the at least one communication session of at least one wireless communication device, particularly at least one UE; provide to a second network entity a request/QoS information/ for an adjustment from a first QoS profile to a second QoS profile of the first QoS flow, wherein the request/QoS information/ is based on the assistance information.

In an implementation of the sixth aspect, the entity is further configured: to provide to a second network entity a request/QoS information/ for an adjustment from a first QoS profile to a second QoS profile of the second QoS flow, wherein the request/QoS information/ is based on the assistance information.

In an implementation of the sixth aspect, the assistance information could be provided for at least one PDU session, for at least one QoS profile, for at least one QoS flow, for at least one UE, for or at least one RAN entity.

In an implementation of the sixth aspect, the assistance information comprises at least one of the following parameters: an identification, ID of the at least one communication session; an identification, ID of at least one QoS profile; an identification, ID of the at least one wireless communication device; an identification, ID of the at least one QoS flow; an indication on whether or not to perform the adjustment by RAN; an indication of the priorities of the adjustment of the QoS profile; timing information, related to the temporal validity and/or periodicity of evaluation for the adjustment of the QoS profile; area information, in which the evaluation for the adjustment applies; event information, in which the evaluation starts and/or ends and/or suspends and/or resumes; cost information for enabling the entity to provide the request/QoS information; resource requirement of the at least one QoS profile.

In an implementation of the sixth aspect, the adjustment from a first QoS profile to a second QoS profile is at least one of the following: an upgrade to a better QoS profile for at least one communication session; a downgrade to a worse QoS profile for at least one communication session.

In an implementation of the sixth aspect, the adjustment of the QoS profile is based on the obtained configuration/assistance information and/or the evaluation of the RAN capability for supporting the adjustment for at least one communication session.

In an implementation of the sixth aspect, the evaluation of whether RAN can support the QoS adjustment is based on aperiodic or periodic monitoring of the real-time actual or expected radio resource quality, traffic load, and resource availability for the at least one QoS profile, in particular at least one of the alternative QoS profile and current QoS profile, based on the obtained assistance information.

In an implementation of the sixth aspect, the evaluation of whether RAN can support the QoS adjustment is a Radio Resource Control (RRC) functionality and/or a Radio Resource Management (RRM) functionality.

In an implementation of the sixth aspect, the assistance information is obtained from a network entity and/or a network management entity and/or an application entity.

In an implementation of the sixth aspect, the request/QoS information comprises at least one of the following parameters: an indication of whether a QoS profile has been changed; a new or a potential/intended QoS profile based on the adjustment of a QoS flow; a cost information; a priority of the adjustment of a QoS profile.

A seventh aspect of the present disclosure provides a network entity, which is configured to: provide assistance information for the adjustment of at least one QoS profile for the at least one communication session of at least one wireless communication device, particularly at least one UE; obtain a request/QoS information/ for an adjustment from a first QoS profile to a second QoS profile of the first QoS flow, wherein the request/QoS information/ is based on the assistance information.

An eighth aspect of the present disclosure provides a network management entity, which is configured to: provide assistance information for the adjustment of at least one QoS profile for the at least one communication session of at least one wireless communication device, particularly at least one UE.

A ninth aspect of the present disclosure provides an application entity, which is configured to: provide assistance information for the adjustment of at least one QoS, profile for the at least one communication session of at least one wireless communication device, particularly at least one UE; obtain a request/QoS information/ for an adjustment from a first QoS profile to a second QoS profile of the first QoS flow, wherein the request/QoS information/ is based on the assistance information.

A tenth aspect of the present disclosure provides a method for adjusting QoS, comprising: obtain assistance information for the adjustment of at least one Quality of Service, QoS, profile for the at least one communication session of at least one wireless communication device, particularly at least one UE; provide to a second network entity a request/QoS information/ for an adjustment from a first QoS profile to a second QoS profile of the first QoS flow, wherein the request/QoS information/ is based on the assistance information.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementations will be explained in the following description of specific embodiments in relation to the enclosed drawings, in which.

DETAILED DESCRIPTION OF EMBODIMENTS

Figure 1:
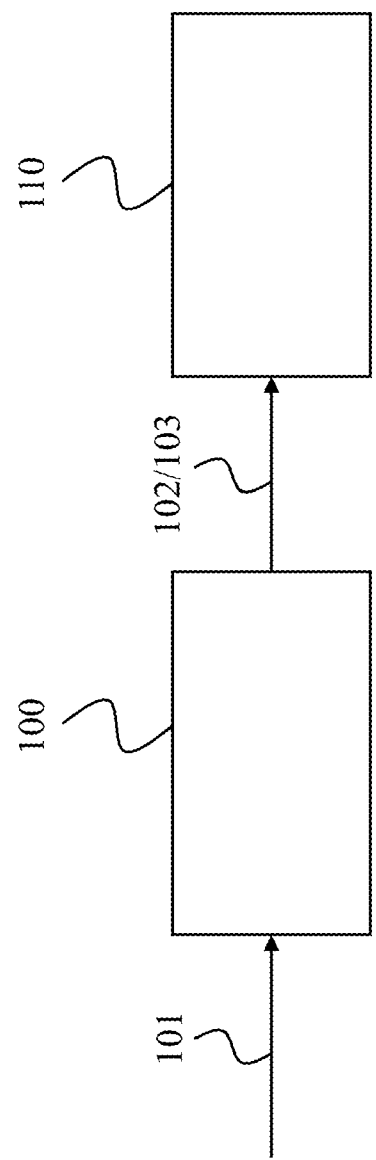
FIG. 1 shows an entity according to an embodiment of the present disclosure.

FIG. 1 shows an entity 100 according to an embodiment of the present disclosure. The entity 100 may be a RAN entity, e.g., may be an entity in RAN (4G system) or NG-RAN (5G system). For instance, it may be a base station. Further, FIG. 2 also shows a second entity 110, which may be a network entity, specifically a CN entity, e.g., in a 5G CN (5GC). The entity 100 is configured to support a procedure for adjusting QoS of at least one QoS flow, e.g., of a first QoS flow and/or a second QoS flow, in a RAN.

To this end, the entity 100 is configured to obtain assistance information 101 for an adjustment of at least one QoS profile for the at least one QoS flow of at least one wireless communication device 400 (see, e.g., FIG. 4), particularly of at least one UE. The entity 100 may obtain the assistance information 101 from another entity (possibly even from the second entity 110). It may also be pre-configured with the assistance information 101, or may generate the assistance information 101 based on evaluating one or more network parameters.

Further, the entity 100 is configured to provide a notification to the second entity 110. In particular, the entity 100 is configured to provide as the notification either a request 102 for an adjustment from a first QoS profile to a second QoS profile of a first QoS flow to the second entity 110, or to provide QoS information 103 for the adjustment from the first QoS profile to the second QoS profile of the first QoS flow to the second entity 110. The request 102 or the QoS information 103 is thereby based on the assistance information 101.

The QoS information 103 may be a result of the adjustment, in case that the entity 100 adjusts the QoS profile itself. The request 102 may be a request that the second entity 110 adjusts the QoS profile, in case that the entity 100 does not adjust itself the QoS profile. The entity 100 may use the assistance information 101 to decide whether to provide, as the notification to the second entity 110, the request 102 or provide the QoS information 103 to the second entity (thus, the request 102 or QoS information 103 are based on the assistance information 101). In particular, the entity may use the assistance information 101 to decide whether to adjust the QoS profile itself or not.

Figure 2:
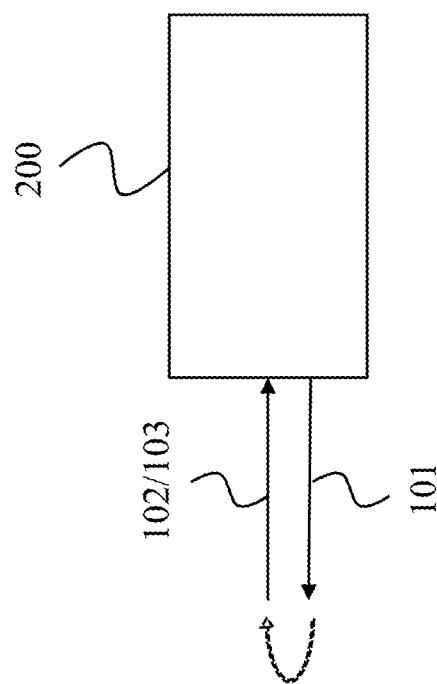
FIG. 2 shows an entity according to an embodiment of the present disclosure.

FIG. 2 shows an entity 200 according to an embodiment of the present disclosure. The entity 200 may be the second entity 110, i.e., it may be a CN entity. However, the entity 200 may also be a different (CN) entity than the entity 110. Generally, the entity 200 may be a network entity, e.g., of a 5GC, or a network management entity, or an application entity. The entity 200 is configured to support the adjusting QoS of at least one QoS flow in a RAN/NG-RAN. For instance, the entity 200 may be configured to support the entity 100 of FIG. 1 in its procedure for adjusting the QoS profile of at least one QoS flow.

To this end, the entity 200 may be configured to provide assistance information 101 for an adjustment of at least one QoS profile for the at least one QoS flow of at least one wireless communication device 400, particularly of at least one UE. For instance, the entity 200 may provide the assistance information 101 to the entity 100 shown in FIG. 1.

Alternatively, or additionally, the entity 200 may be configured to obtain a request 102 for an adjustment from a first QoS profile to a second QoS profile of a first QoS flow, or obtain QoS information 103 for the adjustment from the first QoS profile to the second QoS profile of the first QoS flow. The request 102 or the QoS information 103 is based on the assistance information 101, e.g., as described above with respect to FIG. 1.

Figure 3:
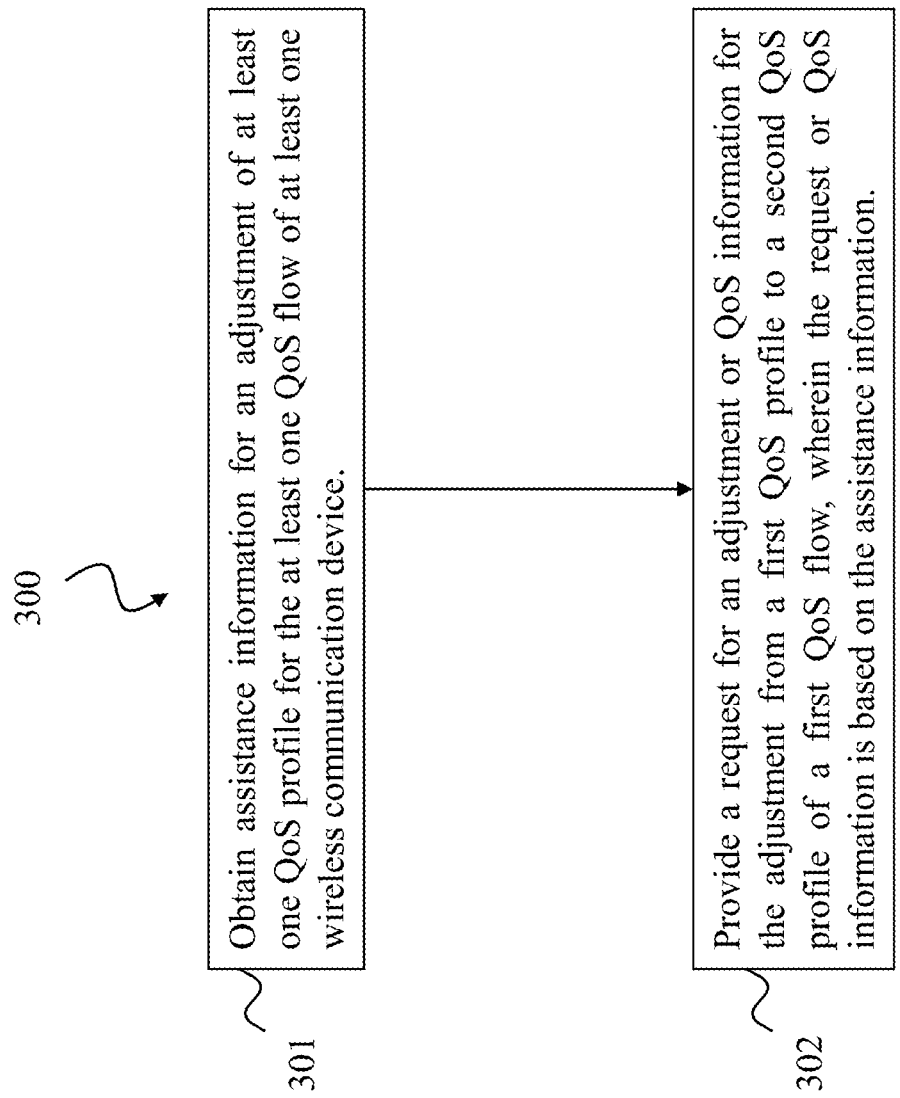
FIG. 3 shows a method according to an embodiment of the present disclosure.

FIG. 3 shows a method 300 for adjusting QoS of at least one QoS flow in a RAN, according to an embodiment of the present disclosure. The method 300 may be performed by the entity 100 shown in FIG. 1. The method 300 comprises: a step 301 of obtaining assistance information 101 for an adjustment of at least one QoS profile for the at least one QoS flow of at least one wireless communication device 400, particularly of at least one UE; and a step 302 of providing a request 102 for an adjustment or QoS information 103 for the adjustment from a first QoS profile to a second QoS profile of a first QoS flow, wherein the request 102 or QoS information 103 is based on the assistance information 101.

Figure 4:
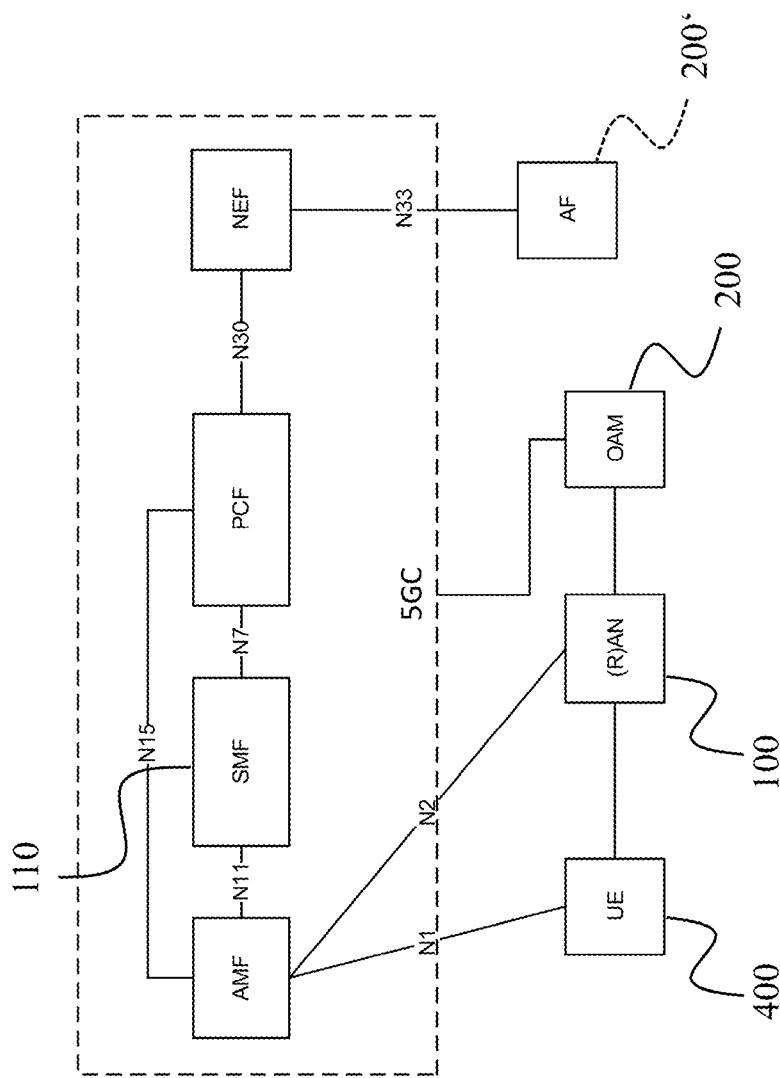
FIG. 4 shows a 5G system comprising entities according to embodiments of the present disclosure.

The embodiments of the present disclosure may be used in a mobile communication network system, in particular, in a $5^{th}$ generation mobile or cellular communication (5G) system (5GS). For instance, the 5GS may be configured as shown in FIG. 4. However, embodiments of the present disclosure may also applied to another network system, which contains one or more of the entities shown in the 5GS of FIG. 4. In particular, the following entities are shown in FIG. 4:

5GC: 5G Core Network
AF: Application Function (AF communicates with PCF via NEF)
AMF: Access and Mobility Management Function
RAN: Radio Access Network
SMF: Session Management Function
UE: User Equipment
PCF: Policy Control Function
NEF: Network Exposure Function
N1, N2, N11, N7, N15, N30, N33 are interfaces between the related entities.
OAM: Operations, Administration and Maintenance As an example, FIG. 4 shows that the "RAN" may be, or may comprise, the entity 100 shown in FIG. 1, i.e., the entity 100 is a RAN entity. The SMF may further be the second entity 110 as shown in FIG. 1. That is, the RAN entity 100 may notify the SMF 200 via AMF regarding the request 102 or the QoS information 103. However, any other 5GC entity may be the second entity 110. The UE may be the UE 400 mentioned above. The OAM may be the entity 200 as shown in FIG. 2. Alternatively or additionally, also the AF may be the entity 200 shown in FIG. 2. That is, the OAM 200 or the AF 200 may provide assistance information 101 to the RAN entity 100, and/or may obtain the request 102 or QoS information 103 from the RAN entity 100.

It should be understood that the RAN may be a NG-RAN and may include one or more base stations (RAN entities) according to embodiments of this disclosure. The one or more base stations may each be an entity 100 as shown in FIG. 1. A base station is, in particular, an apparatus that is deployed in the RAN and that is configured to provide a wireless communication function for a terminal, e.g., the UE 400. The base station may include a macro base station, a micro base station (also referred to as a small cell), a relay node, an access point, and the like in various forms. In systems that use different radio access technologies, a device that has a base station function may have different names. For example, the device is referred to as an evolved NodeB (eNB or eNodeB) in an LTE system, or is referred to as a NodeB in a 3rd generation (3G) system, or is referred to as a gNodeB (gNB) in a future new radio (NR) network. For ease of description, in all the embodiments of this disclosure, the foregoing apparatuses that provide a wireless communication function for the terminal are collectively referred to as base stations.

Next, before explaining in more detail embodiments of the present disclosure, some terms used in the Release 16 3GPP specifications, which terms are related to terms used in the description of embodiments of the present disclosure, are explained:

QoS Flow Mapping:
"When applicable, the SMF provides the following information to the (R)AN:
    QoS Flow Identifier (QFI);
    QoS profile as described in clause 5.7.1.2;
    optionally, Alternative QoS profile as described in clause 5.7.1.2a;"

Alternative QoS Profile:
"The Alternative QoS Profile(s) can be optionally provided for a GBR QoS Flow with Notification control enabled. If the corresponding PCC rule contains the related information (as described in TS 23.503), the SMF shall provide, in addition to the QoS profile, the Alternative QoS Profile(s) to the NG-RAN.

An Alternative QoS profile represents a combination of QoS parameters and has the same format as the QoS profile for that QoS Flow.

When the NG-RAN sends a notification to the SMF that the QoS profile cannot be guaranteed, the NG-RAN may include the reference to the Alternative QoS profile(s) (as specified in clause 5.7.2.4) to indicate the QoS that the NG-RAN can guarantee."

Notification Control:
"If the NG-RAN has received Alternative QoS profile(s) for this QoS Flow and supports the Alternative QoS profile handling, the NG-RAN shall, before sending a notification that the GFBR can no longer be guaranteed towards the SMF, check whether the values of the GFBR, the PDB and the PER parameters that the NG-RAN can guarantee match any of the Alternative QoS profile(s), and if there is a match, the NG-RAN shall indicate the reference to the Alternative QoS profile(s) together with the notification to the SMF."

Furthermore, a "QoS profile" in this disclosure may generally refer to one or more parameters (of QoS) of a QoS parameter set. The one or more parameters of such a QoS parameter set may include: Guaranteed Flow Bit Rate (GFBR), Packet Delay Budget (PDB, including Core Network Packet Delay Budget), Packet Error Rate (PER).

"Multi-level QoS", wherein each QoS level may correspond to a QoS profile, may be implemented by an entity or system. Multi-level QoS means that at least two QoS profiles for one QoS flow are supported. For example, at least one alternative QoS profile is supported, e.g., in addition to a current QoS profile or an original QoS profile.

According to Release 16 3GPP specifications, 5GC may indicate the QoS profile and an alternative QoS profile to the NG-RAN, but it is not specified how the NG-RAN (i.e., a RAN entity responsible for this, e.g., a base station) can upgrade to the original QoS profile or to the alternative QoS profile, which has a higher priority than the current QoS profile, and/or how the NG-RAN may evaluate the possibility to return to the original QoS profile, and/or how the RAN may select the QoS profile for a QoS adjustment.

For the description of embodiments of the present disclosure, the following definitions are also used in this disclosure (from the RAN perspective):

Original/initial QoS profile: received from SMF, which maps to the original requested QoS parameter(s) set(s) from PCF and original requested service requirement from AF.

Alternative QoS profile(s): received from SMF, which maps to the alternative QoS parameter(s) set(s) from PCF and alternative service requirement(s) from AF; one or more alternative QoS profiles are considered in case the original QoS profile cannot be fulfilled.

Active QoS profile: The QoS profile used by RAN for the QoS flow. For example, the currently used QoS profile.

According to Release 16 3GPP specifications:
The active QoS profile can be either the original QoS profile or one of the alternative QoS profile(s)
The original QoS profile is the preferred QoS profile, e.g., QoS profile with highest priority according to the application requirements.

To allow the entity 100 (particularly when located in the NG-RAN or when being an NG-RAN entity) to evaluate the fulfilment or un-fulfilment of one or more QoS profiles per QoS flow, and to allow the entity 100 to adjust dynamically the QoS profile of a QoS flow, embodiments of the present disclosure proposes a transfer of information to the entity 100, e.g., from the entity 200 (particularly located in the 5GC or being a CN entity), e.g., according to the following format:

| Index | QoS profile | Assistance information |
|-------|-------------|------------------------|
| 0 | Original QoS profile | 5 ms, no packet loss |
| 1 | alternative QoS profile ← active QoS profile | — |
| 2 | alternative QoS profile | 1 ms, with packet loss |
| N | alternative QoS profile | 5 ms, with packet loss |

In addition to this information—already defined in 3GPP Release 16 specification—embodiments of the present disclosure propose to provide also additional information to the entity 100, i.e., other than the alternative QoS profiles. That is, embodiments of the present disclosure propose to also provide the assistance information 101 to the entity 100 (e.g., configurations on NG-RAN multi-QoS-profile treatment options (e.g., able or not to adjust QoS for RAN, report before or after the adjustment, report only the selected QoS profile or also some additional information), the priority/preference from 5GC on QoS profile and/or QoS flow selection, allowed switching cost in the sense of allowed packet loss, allowed service interruption time, UE measurement, etc.). The assistance information 101 can be used by the entity 100 to select one or more candidate QoS flows, and/or to evaluate one or more QoS profiles of the candidate QoS flows for possible QoS adjustment (i.e., downgrade/upgrade), potentially considering also NG-RAN condition(s).

Embodiments of the present disclosure also provide a mechanism for evaluating and adjusting the QoS profile of at least one QoS flow by monitoring, by the entity 100, a RAN resource situation and traffic demand, as well as QoS characteristics. Embodiments of the present disclosure also include the provisioning of related signaling between the involved entities 100, 110, 200, for notifying about evaluation results and/or adjustment results of QoS adjustments performed or determined by the entity 100.

Compared to the prior art, embodiments of the present disclosure provide further support for QoS profile adjustment, thus enabling multiple implementation options of multi-QoS profile treatment, and enabling QoS upgrade (not supported by 3GPP Release 16 specification) as well as correlated adjustment of QoS profile(s) of multiple QoS flows (e.g., select some of the QoS flows from multiple QoS flow candidates for the upgrade, upgrade some QoS profiles with the cost of downgrade some other QoS profiles).

In some embodiments of the present disclosure, the entity 100 (e.g., a control unit or a control entity) is located at the RAN (or at a network node, for example, a management entity) and is configured to:

1. Obtain the assistance information 101 related to the adjustment of the at least one QoS flow from one QoS profile (first) to another QoS profile (second) for the QoS flow (communication session) of at least one UE 400. The assistance information 101 may be obtained by the entity 100 from the entity 200 (located in the 5GC), or via an OAM system configuration (generally a network management entity), or from the UE 400, or from an application entity (e.g., AF). The assistance information 101 may be for at least one PDU session, and/or for at least one QoS profile, and/or for at least one QoS flow, and/or for at least one wireless communication device 400, and/or for at least one RAN entity.

2. Perform an evaluation and decide on a potential/actual QoS adjustment for one or more QoS flows, which can be an upgraded to a more desired QoS profile or should be downgraded to a less desired QoS profile, based on the obtained assistance information 101 and optionally based on the result of the evaluation, e.g., based further on at least one of the following: RAN situation and traffic demand, and QoS characteristics. For instance, the adjustment from the first QoS profile to the second QoS profile may be based on the obtained assistance information 101 and on an evaluation of the RAN capability for supporting the adjustment for the at least one QoS flow.

3. Perform the adaptation of the QoS profile based on the assistance information 101 as well as based on the evaluation by RAN (if configured in the assistance information 101). That is, the entity 100 may be configured to perform the above-mentioned evaluation of the RAN capability, and to decide whether to perform the adjustment from the first QoS profile to the second QoS profile based on a result of the evaluation.

4. Provide the evaluation and/or adaptation results to the second entity 110 in the 5GC and/or to an OAM system. For instance, the QoS information 103 may comprise the evaluation and/or the adaption results. Further, also the request 102 (if the entity 100 decides based on the assistance information 101 and the evaluation to not perform the adjustment itself) may comprise the evaluation results.

The entities and methods proposed by the embodiments of the present disclosure are further described in the following. One or more of the following described steps may be optional.

First, a step of obtaining assistance information 101 by the entity 100 (here located in the RAN, i.e., a RAN entity) is described.

The assistance information 101 may be obtained from an entity 200 located in the 5GC, i.e., a CN entity, specifically 5GC entity 200. In this case the assistance information 101 may include:

1. Information used for evaluating the QoS adjustment possibility at the NG-RAN. For example, the assistance information 101 may be used to inform the entity 100 when and where and how to evaluate the QoS adjustment possibility, i.e., to perform the evaluation of the RAN capability for supporting the adjustment for the at least one QoS flow. The evaluation results may be which QoS profile(s) satisfy the evaluation criteria. For instance:

Triggering events for the evaluation: handover, PDU session setup/modification, radio resource condition changes.

The related configuration of the evaluation, e.g.: time (e.g., periodicity), location (e.g., entering a cell/TA/area of interest), priority for the QoS adjustment in case of multiple candidate QoS profiles and QoS flows.

Whether to evaluate only the original QoS profile or all the QoS profiles, which have higher preference/priority/rank than the active QoS profile.

Evaluation criteria at RAN (e.g., allowed switching cost.). For example, the entity 100 may use this information and the evaluation result to determine whether to adjust the QoS profile itself and/or notify the second entity 110 (here in the 5GC)

2. Information used to configure the QoS adjustment at the entity 100 (RAN entity), for instance:

Whether the entity 100 should only provide the evaluation results to the 5GC or whether it should also perform the QoS profile adjustment (i.e., implementation of the adjustment of the QoS profile at the RAN/NG-RAN or not).

In which situation should the entity 100 perform the QoS profile adjustment (e.g., time, location, event, etc.).

3. Information related to the notification, for instance:

Indication of early (i.e., after the evaluation performance by entity 100) and/or late notification (i.e., after the QoS adjustment).

Whether additional parameters are needed in the notification (e.g., switching cost from NG-RAN perspectives).

Notification timing (e.g., allowed notification latency in case situation changed).

Target of the notification (e.g., to entity 110 (5GC), and/or to UE 400).

Figure 5:
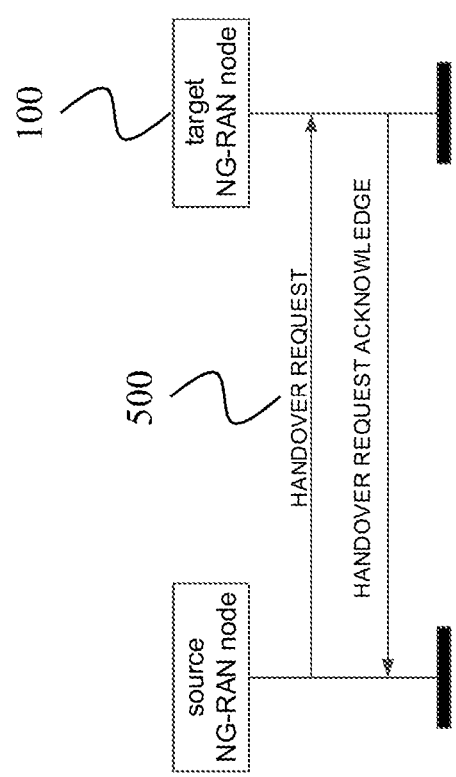
FIG. 5 shows a successful handover resource allocation operation involving an entity according to an embodiment of the present disclosure.
Figure 6:
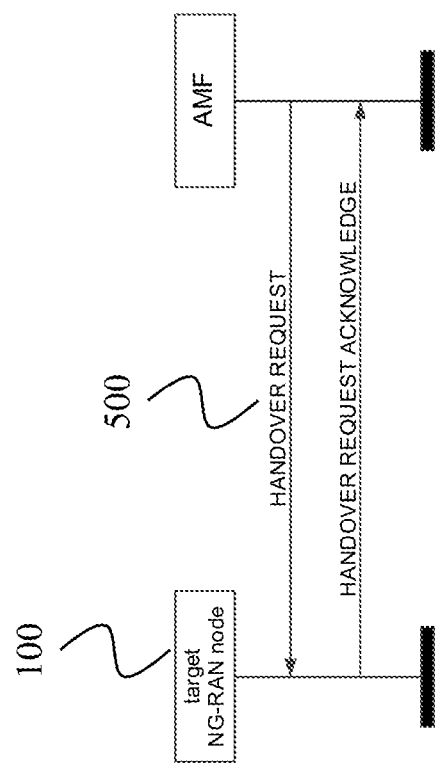
FIG. 6 shows a successful handover preparation operation involving an entity according to an embodiment of the present disclosure.

FIGS. 5 and 6 illustrate the above-described triggering event for the evaluation "handover", which refers to the case where the entity 100 (RAN entity) receives a handover request message 500 from a source RAN (e.g., Xn based handover; see FIG. 5) or from an AMF (e.g., N2 based handover; see FIG. 6). That is, the evaluation of whether the RAN can support the adjustment of the at least one QoS profile may be triggered by a handover and/or by a handover request message 500.

Figure 7:
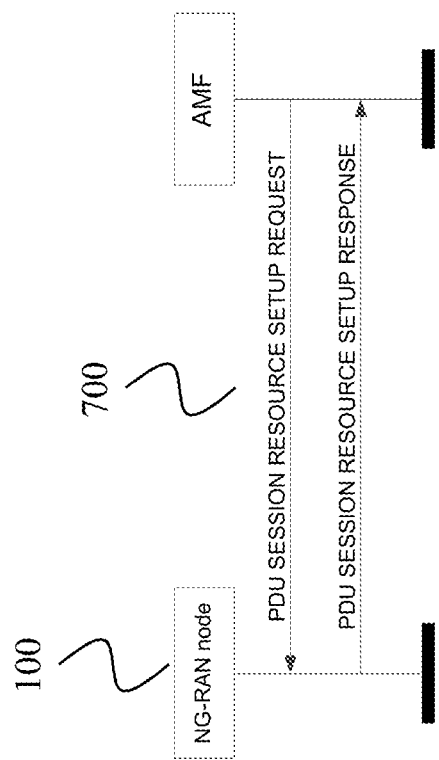
FIG. 7 shows a PDU session resource setup request operation involving an entity according to an embodiment of the present disclosure.
Figure 8:
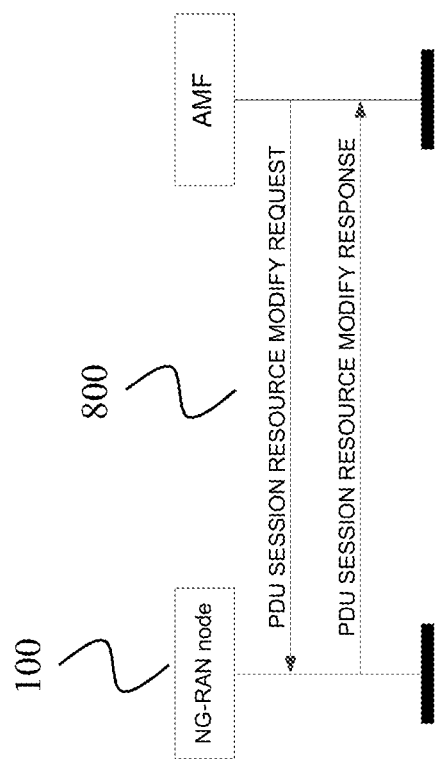
FIG. 8 shows a PDU session resource modify request operation involving an entity according to an embodiment of the present disclosure.

FIGS. 7 and 8 illustrate the above-described triggering event for the evaluation "PDU session setup/modification", which refers to the case where the entity 100 receives a PDU session setup message 700 (see FIG. 7) or PDU modification message 800 (see FIG. 8) from the AMF to an alternative QoS profile or to the original QoS profile.

The above-described triggering event "radio resource condition changes" (e.g., the available resource of a RAN node is higher than a determined threshold) can come internally from other RAN entities (e.g., direct from the RRM, some data analytics function such as part of minimum drive test (MDT)), or externally (e.g., from OAM system, 5GC or UE). 5GC or OAM system can also bridge the triggering event from the application server (e.g., as the $3^{rd}$ party AF). The UE 400 can bridge the triggering event from the application client at the UE 400.

The assistance information 101 received from the entity 200 (5GC entity) can be carried by the PDU session establishment/modification message 700/800, e.g., from SMF to the entity 100 via AMF as shown in FIG. 7 or 8.

In a possible implementation illustrated below (see Tables 1 and 2), the assistance information 101 per QoS flow can be included in the "PDU session resource setup request transfer" message 700 shown in FIG. 7. Here the assistance information 101 can be for example, priority for the QoS adjustment (e.g., selection of the QoS profile and/or QoS flow). The "Alternative QoS Flow Level QoS Parameters List" may include at least one "Alternative QoS Flow Level QoS Parameters item". It may also include one "Alternative QoS Flow Level QoS Parameters item", which maps to the original QoS profile before the 5GC asks for a downgrade to an alternative QoS profile. For example, a candidate QoS profiles list or an alternative QoS profile list may include the original QoS profile.

TABLE 1

(PDU Session Resource Setup Request Transfer):

| IE/Group Name | Presence | Range | IE type and reference | Semantics description |
|---|---|---|---|---|
| PDU Session Aggregate Maximum Bit Rate | O | | 9.3.1.102 | This IE shall be present when at least one non-GBR QoS flow is being setup. |
| UL NG-U UP TNL Information | M | | UP Transport Layer Information 9.3.2.2 | UPF endpoint of the NG-U transport bearer, for delivery of UL PDUs. |
| Additional UL NG-U UP TNL Information | O | | UP Transport Layer Information 9.3.2.2 | UPF endpoint of the additional NG-U transport bearer, for delivery of UL PDUs. |
| Data Forwarding Not Possible | O | | 9.3.1.63 | |
| PDU Session Type | M | | 9.3.1.52 | |
| Security Indication | O | | 9.3.1.27 | |
| QoS Flow Setup Request List | | 1 | | |

TABLE 1-continued (PDU Session Resource Setup Request Transfer):

| IE/Group Name | Presence | Range | IE type and reference | Semantics description |
|---|---|---|---|---|
| >QoS Flow Setup Request Item | | 1 . . . <maxnoofQoSFlows> | | |
| >>QoS Flow Indicator | M | | 9.3.1.51 | |
| >>QoS Flow Level QoS Parameters | M | | 9.3.1.12 | |
| >>assistance information (e.g., priority for the QoS adjustment for this flow) | O | | | |
| >>Alternative QoS Flow Level QoS Parameters List | O | 1 | | |
| >>>Alternative QoS Flow Level QoS Parameters Item | | 1 . . . <maxnoofQoS profiles> | | |
| >>>>QoS Flow Level QoS Parameters | | | 9.3.1.12 | |
| >>E-RAB ID | O | | 9.3.2.3 | |

TABLE 2

| Range bound | Explanation |
|---|---|
| maxnoofQoSFlows | Maximum no. of QoS flows allowed within one PDU session. Value is 64. |
| maxnoofQoSProfiles | Maximum no. of QoS Profiles allowed for one QoS flow. Value is 8. |

In another possible implementation illustrated below (see Table 3), the assistance information 101 (RAN Adaptation Control) may be configured per QoS profile. For example, the PCF may configure whether the entity 100 is allowed to perform the QoS profile adjustment (RAN Adaptation Control) in the GBR QoS Flow information. This information may be passed to the entity 100 as a part of the PDU session context during the PDU session establishment/modification procedure.

TABLE 3

(GBR QoS Flow Information):

| IE/Group Name | Presence | Range | IE type and reference | Semantics description |
|---|---|---|---|---|
| Maximum Flow Bit Rate Downlink | M | | Bit Rate 9.3.1.4 | Maximum Bit Rate in DL. Details in TS 23.501 [9]. |
| Maximum Flow Bit Rate Uplink | M | | Bit Rate 9.3.1.4 | Maximum Bit Rate in UL. Details in TS 23.501 [9]. |
| Guaranteed Flow Bit Rate Downlink | M | | Bit Rate 9.3.1.4 | Guaranteed Bit Rate (provided there is data to deliver) in DL. Details in TS 23.501 [9]. |
| Guaranteed Flow Bit Rate Uplink | M | | Bit Rate 9.3.1.4 | Guaranteed Bit Rate (provided there is data to deliver). Details in TS 23.501 [9]. |
| Notification Control | O | | ENUMERATED (notification enabled, . . . ) | Details in TS 23.501 [9]. |
| RAN Adaptation Control | O | | ENUMERATED (RAN adaptation enabled, . . . ) | Details in TS 23.501 [9]. |
| Maximum Packet Loss Rate Downlink | O | | Packet Loss Rate 9.3.1.79 | Indicates the maximum rate for lost packets that can be tolerated in the downlink direction. Details in TS 23.501 [9]. |

Both "Notification Control" IE and "RAN Adaptation Control" IE in Table 3 can also be implemented per QoS flow, e.g., as part of the "assistance information" given in Table 1. In this case there is no need for it to be repeated for each "Alternative QoS Flow Level QoS Parameters Item".

In another implementation, the assistance information 101 could also be provided per UE e.g., as part of NG context setup.

The assistance information 101 may also be obtained from an OAM system, which is or comprises the entity 200, e.g., from a management entity 200. The OAM system may also provide the NG-RAN configurations of the QoS evaluation/adjustment functionality in a pre-operation/deployment phase or operation phase, per service, and/or per geographical area. Such configurations may include the assistance information 101, such as priority for the QoS adjustment, periodicity, the geographic area the QoS evaluation/adjustment applies as well as the time validity. This assistance information 101 may support the entity 100 (NG-RAN) to perform QoS adjustment for a given geographic area or a given service type (e.g., based on the service ID) based on the operator's or service providers' policies. For example, the service could be V2x service or video service.

A configuration message can be sent from the OAM to the entity 100 with at least one of the following parameters:
Service ID
UE ID (similar to Close Subscribe Group).
Optionally Network Slice Selection Assistance Information (NSSAI).
Monitoring/Evaluation configuration.
Geographical area (cell, Tracking Area level).
Time validity, Periodicity.
QoS characteristic Thresholds.
Priority for the QoS adjustment for the QoS flow (per service/UE).
UE/RAN measurements requirement.
Original QoS profile and list of alternative QoS profiles (per service).

The assistance information 101 could be or comprise one or more of the above parameters.

Figure 9:
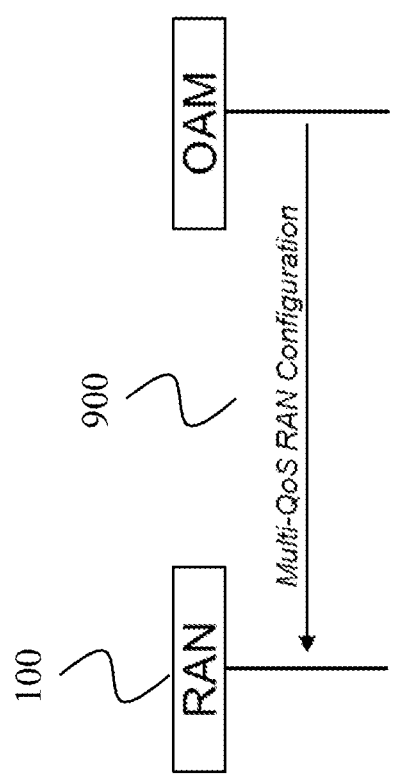
FIG. 9 shows a multi-QoS RAN configuration operation involving an entity according to an embodiment of the present disclosure.

When obtained from the OAM system, the assistance information 101 can be provided per RAN node and/or per UE. For example, the assistance information 101 can be part of the RAN configurations that is sent via the interface between OAM system and the entity 100, as shown in FIG. 9.

The assistance information 101 may also be obtained by the entity 100 from the UE 400. In case some information is originated from an application, assistance information 101 can be provided by the UE 400 to the entity 100 (located in the NG-RAN), i.e., the UE 400 may bridge assistance information 101 (from application client) to the entity 100, rather than the 5GC bridging the assistance information 101 (e.g., from an application server) to the entity 100.

Figure 10:
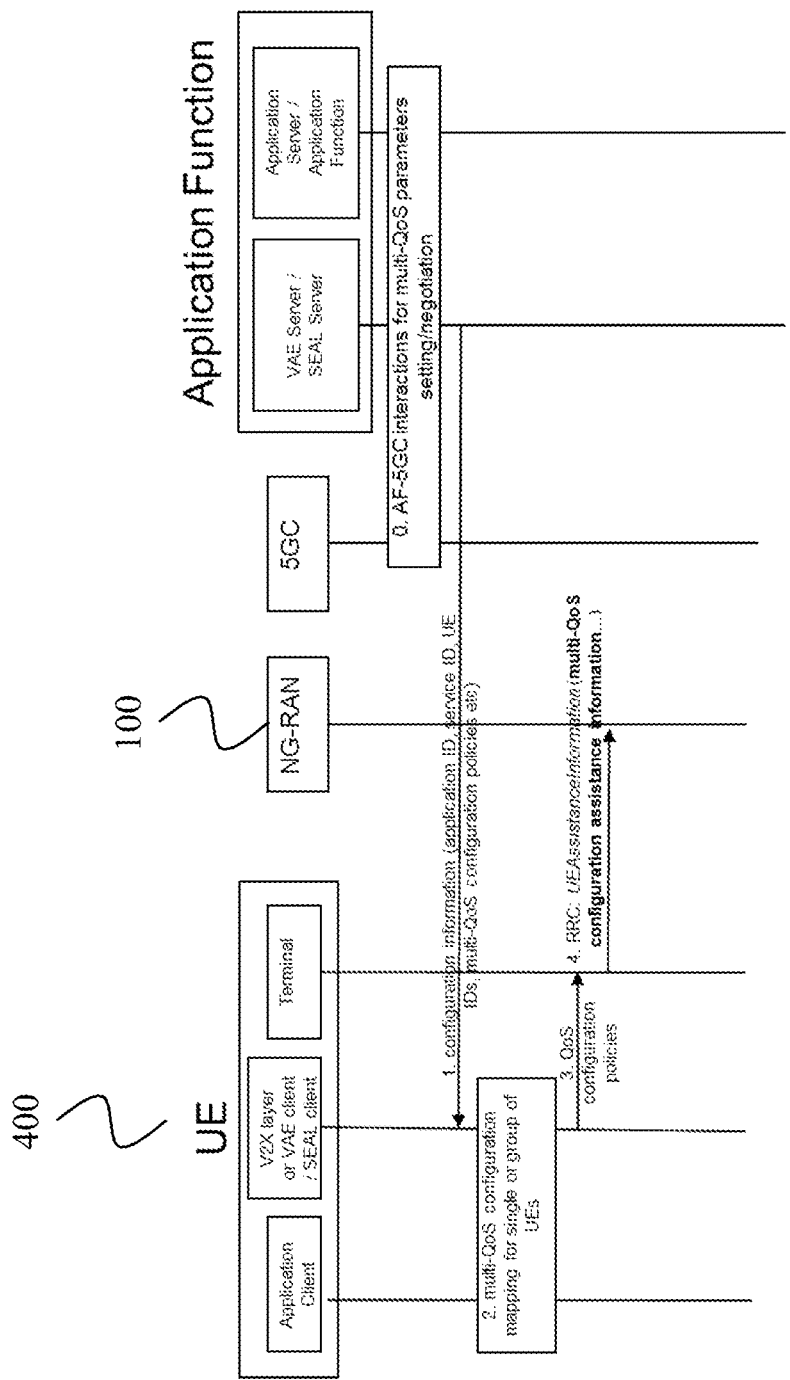
FIG. 10 shows an operation for obtaining assistance information involving an entity according to an embodiment of the present disclosure.

As shown in FIG. 10, in this case the application client at the UE 400, or an vertical application enabler client (e.g., as specified in TS23.434), may receive from an application server or application enabler server some assistance information 101 or policies via application layer signaling (e.g., V1, V1-AE, VAL-UU, SEAL-UU as specified in TS23.434/23.286). This can be done at the configuration policy provisioning phase or during the service operation. Based on this information, the application at the UE can provide this assistance information 101 to the V2X or Vertical Layer and to the AS layer. In this case, the assistance information 101 can be sent to the entity 100 (in the NG-RAN) via RRC signaling (UEAssistanceInformation).

Initially, after the interaction between 5GC and AF, the application server or enabler server (which includes AF functionality) may send the necessary configuration information to the application of the UE 400 via application layer signaling. This may include also an application ID or service ID or UE ID, as well as the configuration policies. The application client or application enabler client performs the mapping for single of multiple UEs (in case of group communications) and sends this to the AS layer (in case of V2X-UE this will pass through the V2X layer). This is mapped to QoS configuration policies and then is sent over RRC to NG-RAN to support the selection of QoS adjustment.

One or more above steps that are shown in FIG. 10 may be optional. For example, steps 0-3 in FIG. 10 may be optional steps.

Second, a step of evaluating a QoS adjustment using the obtained assistance information 101 by the entity 100 (in the RAN) is described. Some terms are explained first:
CSI: Channel State Information
RRM: Radio Resource Management
RLM: Radio Link Monitoring
ICIC: Inter-Cell Interference Coordination
eICIC: enhanced ICIC
UL/DL: UpLink/DownLink
RRC: Radio Resource Control
PRB: Physical Resource Blocks
PDCP: Packet Data Convergence Protocol Based on one or more measurements from the UE 400 (such as radio measurements, e.g., CSI/RRM/RLM measurements) and other RAN nodes (such as backhaul radio measurements, e.g., BH RRM/RLM/CSI or ICIC/eICIC info, load information from surrounding BSs etc.), the entity 100 at the RAN may verify the QoS, and evaluate possible a QoS adjustment from the RAN perspective. The evaluation and adjustment (i.e., upgrade/downgrade) criteria for such decision are implementation specific and are based on at least one of the following factors:
Packet Delay in the DL per 5QI.
Packet Discard Rate in the DL per 5QI.
Packet Loss Rate in the UL per 5QI.
UL PDCP Packet Delay per 5QI.
Per 5QI load.
UL/DL Total PRB Usage.
Distribution of UL/DL Total PRB Usage.
UL/DL PRB used for data traffic.
Average UL/DL UE throughput in gNB.
Distribution of UL/DL UE throughput in gNB.
Number of RRC Connections.
QoS flow related measurements and statistics (e.g., QoS flow activity, QoS flow setup).

The entity 100 (NG-RAN) may initially obtain the QoS profiles per PDU session from the entity 200 in the 5GC (in INITIAL CONTEXT SETUP or MODIFICATION REQUEST as part of the QoS requirements as defined in TS38.413) and/or the QoS policies (assistance information) from OAM or 5GC/AF (application server) or UE (application client) including the multiple QoS profiles per PDU session.

Upon receipt of the INITIAL CONTEXT SETUP REQUEST message, the entity 100 may store the received QoS profiles per PDU session or QoS flow, which may include the requested QoS profile, alternative QoS profile(s) and assistance information 101, helping the entity 100 to treat the alternative QoS profiles.

Upon receipt of the UE CONTEXT MODIFICATION REQUEST message, the entity may store the received QoS profiles per PDU session or QoS flow, which may include the requested QoS profile, alternative QoS profiles and assistance information 101.

Additionally, the entity 100 may determine the mapping of the QoS flow to QoS profile, evaluate the alternative QoS profiles, and notify the results to the second entity 110 in the 5GC (may be the entity 200) based on the configuration from the entity 200 in the 5GC (i.e., QoS profile, alternative QoS profiles and optionally additional information for 5GC to decide on QoS profile adjustment).

Third, a step of providing the evaluation and/or adjustments results by the entity 100 (here in the RAN) is described.

The entity 100 may provide the evaluation and/or adjustments results to the entity 110 in the 5GC. The evaluation result may be provided in the request 102 or the QoS information 103. The adjustment result may be provided in the QoS information 103.

After the evaluating of potential QoS adjustment, if the entity is not (yet) allowed to adjust the QoS, the entity 100 may provide a first notification to the entity 110, on whether upgrade is possible (this first notification may be, or be comprised in, the request 102). The first notification may include at least one of the potential QoS profile, and optional assistance information such as the cost/priority (from RAN perspectives) to switch to this potential QoS profile.

A full list of the information in this notification may include at least one of the following:
 The cause of the notification (potential or intended upgrade/downgrade, results of the adjustment)
 A new or a potential/intended QoS profile based on the adjustment of the QoS.
 Optionally, a flag which indicate the notification is for upgrade or downgrade.

The priority may be used to indicate the preference from RAN implementation point of view to change to adjust to this QoS profile (e.g., QoS profile consumes less radio resource will have a higher priority).

Figure 11:
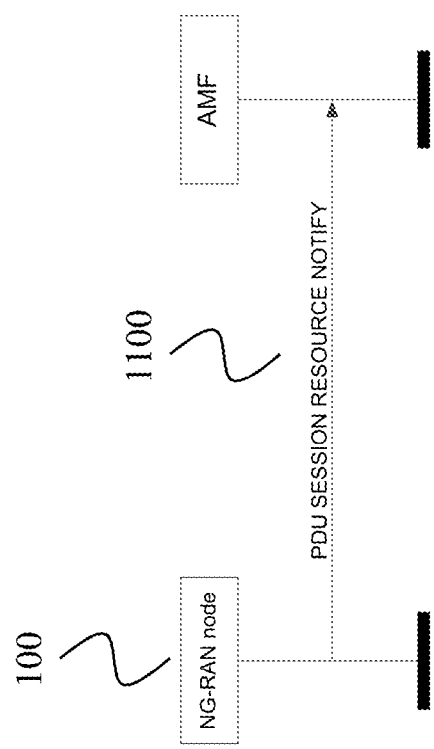
FIG. 11 shows a PDU session resource notify operation involving an entity according to an embodiment of the present disclosure.

This first notification of achievable QoS can be carried in the PDU session resource notify transfer message 1100, as shown in FIG. 11. The purpose of the PDU Session Resource Notify procedure is to notify that the already established QoS flow(s) or PDU session(s) for a given UE are released or not fulfilled anymore or fulfilled again by the NG-RAN node for which notification control is requested. The procedure may use UE-associated signaling. The entity 100 may initiate the procedure by sending a PDU SESSION RESOURCE NOTIFY message 1100. The PDU SESSION RESOURCE NOTIFY message 1100 may contain the information of PDU session resources or QoS flows which are released or not fulfilled anymore or fulfilled again by the entity 100.

Further, Table 4 and 5 show one implementation of the enhanced notification message described above in TS38, 413. The notification cause may be set to "not fulfilled" in case of downgrade and "fulfilled" in case of upgrade (where the current QoS profile can still be fulfilled).

For the QoS flows with multiple QoS profiles, the PDU SESSION RESOURCE NOTIFY message shall include:
 The list of GBR QoS flows which are not fulfilled anymore, and an indication of which alternative QoS profile can be supported if any
 If a more desired QoS profile than the current one can be fulfilled, the list of GBR QoS flows and an indication of the corresponding QoS profile.
 If NG-RAN is allowed to perform QoS profile adjustment, the list of adjusted GBR QoS flows and an indication of the corresponding QoS profile after adjustment.

TABLE 4

(PDU Session Resource Notify Transfer):

| IE/Group Name | Presence | Range | IE type and reference | Semantics description |
|---|---|---|---|---|
| QoS Flow Notify List | | 0 . . . 1 | | |
| >QoS Flow Notify Item | | 1 . . . <maxnoofQoSFlows> | | |
| >>QoS Flow Indicator | M | | 9.3.1.51 | |
| >>Notification Cause | M | | ENUMERATED (fulfilled, not fulfilled, adapted . . . ) | |
| >>Achievable/current QoS profile | O | | QoS profile indicator | |
| >>switching cost/priority | O | | ENUMERATED (high, medium, low) | |
| QoS Flow Released List | O | | QoS Flow List 9.3.1.13 | |

Optionally switching cost or priority from RAN perspectives.
 An updated priority of QoS profiles to the at least one QoS flow (communication session).
 An update to the switching cost for at least one QoS flow and/or a geographical area (cell area).

The cost of switching may consist of at least one of the following parameters: packet loss, service interruption time, impacts to other GBR QoS flows. Each of the parameter could be indicated numerically (e.g., 10 ms), logically (e.g., yes/no), or relatively (e.g., high/medium/low).

TABLE 5

| Range bound | Explanation |
|---|---|
| maxnoofQoSFlows | Maximum no. of QoS flows allowed within one PDU session. Value is 64. |

The switching cost in the example above can be also indicated in the form of a parameter, e.g., timer, thresholds Instead of indicating, in the first notification, the cause, a new "Upgrade or downgrade flag" IE can be introduced to indicate different scenarios such as upgrade, downgrade.

Figure 12:
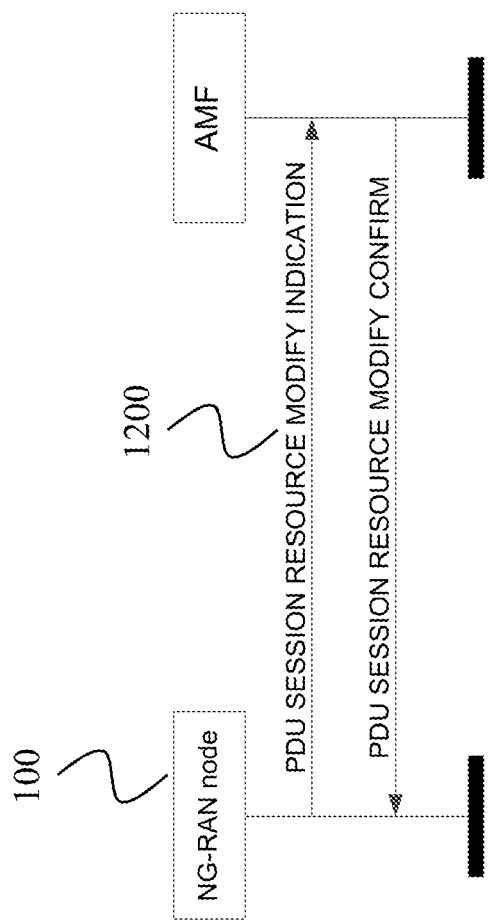
FIG. 12 shows a successful PDU session resource modify indication operation involving an entity according to an embodiment of the present disclosure.

Furthermore, this first notification could be also provided as particular embodiment in PDU Session Resource Modify Indication in a similar way. That it, the first notification of achievable QoS can be carried in the PDU session Resource Modify Indication 1200, as shown in FIG. 12. The purpose of the PDU Session Resource Modify Indication procedure is for the entity 100 to request modification of the established PDU session(s). The procedure may use UE-associated signaling.

For the QoS flows with multiple QoS profiles, the PDU SESSION RESOURCE NOTIFY message shall include:
- The list of GBR QoS flows which are not fulfilled anymore, and an indication of which alternative QoS profile can be supported if any.
- If a more desired QoS profile than the current one can be fulfilled, the list of GBR QoS flows and an indication of the corresponding QoS profile.
- If NG-RAN is allowed to perform QoS profile adjustment, the list of adjusted GBR QoS flows and an indication of the corresponding QoS profile after adjustment.

Further, Table 6 shows one implementation used to provide a second notification (this may be, or comprise, the QoS information 103), in order to indicate to the entity 110 in the 5GC the intent to change the QoS profile (early notification). The entity 110 (5GC) could provide this information further to the application. And the entity 110 and the application could be prepared from 5GC/application side for the QoS profile change or stop the change at the entity 100 if not desired (in case of the early notification).

In addition to this early notification on e.g., the intended changes, the entity 100 may provide additionally a third notification (this may be, or comprise the QoS information 103) to the entity 110 in the 5GC after the completion of the adjustment (late notification). The third notification to the entity 110 in the 5GC may include an indication to the current QoS profile. This additional notification can be implemented using the same PDU session Resource Notify Transfer message. And the IE of switching cost can be skipped. A new Notification Cause of "adapted" should be added to indicate 5GC the need to change the QoS profile accordingly. This late notification can also be implemented using PDU Session Resource Modify Request Transfer message instead as indicated above. Due to the adaptation of the QoS profile, the entity 100 may update the priority/rank/level/preference mapping of QoS profiles and provides to the 5GC.

TABLE 6

(PDU Session Resource Modify Indication Transfer):

| IE/Group Name | Presence | IE type and Range | Semantics reference | description |
|---|---|---|---|---|
| DL QoS Flow per TNL Information | M | | QoS Flow per TNL Information 9.3.2.8 | NG-RAN node endpoint of the NG-U transport bearer for delivery of DL PDUs, together with associated QoS flows. |
| Additional DL QoS Flow per TNL Information | O | | QoS Flow per TNL Information List 9.3.2.1 | NG-RAN node endpoint of the additional NG-U transport bearer(s) for delivery of DL PDUs for split PDU session, together with associated QoS flows |
| Secondary RAT Usage Information | O | | 9.3.1.114 | |
| Security Result | O | | 9.3.1.59 | Current UP security status |
| QoS Flow Modify List | | 0 . . . 1 | | |
| >QoS Flow Modify Item | | 1 . . . <maxnoofQoSFlows> | | |
| >>QoS Flow Indicator | M | | 9.3.1.51 | |
| >>switching cost/priority | O | | ENUMERATED (high, medium, low) | |
| >>Notification Cause | O | | ENUMERATED (fulfilled, not fulfilled, adapted . . . ) | |

"Cause for modification" can also be implemented using a flag, e.g., "upgrade or downgrade flag"

Based on the first notification (which may be the request 102), the entity 100 may receive instructions to adjust the QoS or the QoS may be adjusted by another entity, e.g., the entity 110.

If the entity 100 (NG-RAN) is allowed to adjust the QoS profile by itself, the same notification mechanism can be The entity 100 may provide the evaluation and/or adjustments results to the entity 110 in an OAM system. The evaluation and/or adaptation results could also be provided to OAM system using the management interface between the entity 100 (NG-RAN) and OAM. OAM could for example use such information as feedback to coordinate the related policy configurations on multi-QoS treatment cross multiple NG-RAN nodes for load balancing.

In the following some examples in actual use cases are described.

EXAMPLE 1: Different Operation Options Using Assistance Information 101

Different operation options on Multi-QoS treatment existing considering the determination of the QoS adjustment, perform the QoS adjustment and notify the 5GC on results. There are 2 options of operation regarding to the determination of the QoS adjustment:

Option 1: The entity 100 (NG-RAN) determines the QoS adjustment and notifies the entity 110 (5GC)

Option 2: The entity 110 (5GC) determines the QOS adjustment based on the information provided by the entity 100 (NG-RAN).

The assistance information 101 from the entity 200 (5GC) may indicate to the entity 100 which option should be used and also the needed information for the entity 100 to operate in that option. For instance, in option 1, the assistance information 101 may include the information help the entity 100 determine the QoS adjustment (e.g., allowed cost of switching, 5GC preference on the switching). For option 2, the assistance information 101 may include the information on what the entity 100 should report to the entity 110 (e.g., cost of switching, RAN preference on the switching).

In case of option 1, the entity 100 can additionally perform the QoS adjustment at the RAN side and/or notify the entity 110 in the 5GC on the RAN QoS adjustment results if configured to do so according to the assistance information 110.

EXAMPLE 2: Multi QoS Flow Treatment Using Assistance Information

When the entity 100 (NG-RAN) does not have the capability to upgrade all the candidate QoS flows (e.g., only 20 upgrades possible out of 100 QoS flows), it may select the QoS flows to be upgraded according to the assistance information 101 like the preference/priority provided by the entity 200 (5GC/OAM).

The preference/priority could be derived from the application requirements or service level agreement with the customer or network deployment consideration. For instance, TSN/V2X services would require the QoS recovery/upgrade as soon as possible. While some services can tolerate a little bit longer time to work in a downgraded QoS (e.g., live streaming). In this case, a higher priority would be provided to NG-RAN for TSN/V2X service on the upgrade and a low priority would be provided to the NG-RAN for the live streaming service.

Based on the priority/preference information from the 5GC, NG-RAN can decides on the following:

1. Only some of the candidate to be upgraded QoS flows at one NG-RAN node (e.g., gNB) are choose to be upgraded at certain time
2. Some QoS flows at one NG-RAN node are choose to be upgraded, and some other QoS flows at this NG-RAN node have to be downgraded due to the upgrade at certain time The proposed embodiments are based on a unique signaling in the radio interface, NGAP interface and possibly RAN-OAM interface which involves exchange of new messages; messages that are already available are enhanced with new information element.

According to another aspect of the present disclosure, a communications apparatus is provided, including at least one of the following: a bus, a processor, a storage medium, a bus interface, a network adapter, a user interface, and an antenna, where the bus is configured to connect the processor, the storage medium, the bus interface, and the user interface; the processor is configured to perform the above method; the storage medium is configured to store an operating system and to-be-sent or to-be-received data; the bus interface is connected to the network adapter; the network adapter is configured to implement a signal processing function of a physical layer in a wireless communications network; the user interface is configured to be connected to a user input device; and the antenna is configured to send and receive a signal.

Another aspect of this disclosure provides a computer-readable storage medium, where the computer-readable storage medium stores an instruction, and when the computer-readable storage medium runs on a computer, the computer performs the above method.

Another aspect of this disclosure provides a computer program product including an instruction, where when the computer program product runs on a computer, the computer performs the above method.

Another aspect of this disclosure provides a computer program, where when the computer program runs on a computer, the computer performs the above method.

Method or algorithm steps described with reference to the content disclosed in this application may be implemented by hardware, or may be implemented by a processor by executing a software instruction. The software instruction may include a corresponding software module. The software module may be stored in a random-access memory (RAM), a flash, a read-only memory (ROM), an EPROM, an erasable programmable ROM (EEPROM), a register, a hard disk, a removable hard disk, a compact disk ROM (CD-ROM), or any other form of storage medium known in the art. For example, a storage medium is coupled to a processor, so that the processor can read information from the storage medium and write information into the storage medium. Certainly, the storage medium may be a component of the processor. The processor and the storage medium may be located in an application-specific integrated circuit (ASIC). In addition, the ASIC may be located in user equipment. Certainly, the processor and the storage medium may exist in the user equipment as discrete components.

The foregoing embodiments may be all or partially implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or may be a data storage device, such as a server or a data center, integrating one or more usable media.

The usable medium may be a magnetic medium (for example, a floppy disk, a hard disk, or a magnetic tape), an optical medium (for example, a DVD), a semiconductor medium (for example, a solid state disk (SSD)), or the like.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application recited in the claims.

The present disclosure has been described in conjunction with various embodiments as examples as well as implementations. However, other variations can be understood and effected by those persons skilled in the art and practicing the present disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A radio access network (RAN) entity for adjusting quality of service (QOS) of at least one QoS flow in a RAN, the RAN entity comprising:
    a memory; and
    a processor coupled to the memory, wherein the processor is configured to:
        obtain assistance information for an adjustment of at least one QoS profile for the at least one QoS flow of at least one wireless communication device;
        based on the assistance information obtained, determine whether to:
            send a request for an adjustment for the at least one QoS profile for the at least one QoS flow, or
            perform the adjustment of the at least one QoS profile for the at least one QoS flow based on the assistance information;
        based on determining to send the request for the adjustment, provide, to a core network (CN) entity, the request for the adjustment based on the assistance information; and
        based on determining to perform the adjustment of the at least one QoS profile for the at least one QoS flow, perform the adjustment and send QoS information to the CN entity,
        wherein the QoS information is based on the assistance information, and
        wherein the adjustment comprises changing the at least one QoS profile from a first QoS profile to a second QoS profile.

2. The RAN entity according to claim 1, wherein the processor of the RAN entity is further configured to:
    provide, to the CN entity, a further request for a second adjustment or further QoS information for the second adjustment from the first QoS profile to the second QoS profile of a second QOS flow, wherein the further request or the further QoS information is based on the assistance information.

3. The RAN entity according to claim 1, wherein:
    the assistance information is provided for at least one packet data unit (PDU) session, for the at least one QoS profile, for the at least one QoS flow, for the at least one wireless communication device, or for at least one RAN entity.

4. The RAN entity according to claim 1, wherein the assistance information comprises at least one of:
    an identification (ID) of at least one packet data unit (PDU) session;
    an ID of the at least one QoS profile;
    an ID of the at least one wireless communication device; or
    an ID of the at least one QoS flow.

5. The RAN entity according to claim 1, wherein the assistance information comprises at least one of:
    an indication on whether or not to perform the adjustment by the RAN entity;
    an indication of priorities of the adjustment of the at least one QoS profile;
    timing information related to a temporal validity or periodicity of an evaluation for the adjustment of the at least one QoS profile;
    area information indicating an area, in which the evaluation for the adjustment of the at least one QoS profile applies;
    event information indicating an event, in which the evaluation starts, ends, suspends, or resumes; or
    a resource requirement of the at least one QoS profile.

6. The RAN entity according to claim 1, wherein the assistance information comprises at least one of:
    cost information for enabling the RAN entity to provide the request or the QoS information.

7. The RAN entity according to claim 1, wherein:
    the adjustment from the first QoS profile to the second QoS profile comprises at least one of:
    an upgrade to a better or more desired QoS profile for the at least one QoS flow; or
    a downgrade to a worse or less desired QoS profile for the at least one QoS flow.

8. The RAN entity according to claim 1, wherein the RAN entity is further configured to:
perform the adjustment from the first QoS profile to the second QoS profile; and
provide the QoS information to the CN entity.

9. The RAN entity according to claim 8, wherein:
the QoS information comprises a result of the adjustment.

10. The RAN entity according to claim 1, wherein:
the adjustment from the first QoS profile to the second QoS profile is based on the obtained assistance information or an evaluation of the RAN capability for supporting the adjustment for the at least one QoS flow.

11. The RAN entity according to claim 10, wherein the RAN entity is further configured to:
perform the evaluation of the RAN capability for supporting the adjustment for the at least one QoS flow; and
determine whether to perform the adjustment from the first QoS profile to the second QoS profile based on a result of the evaluation.

12. The RAN entity according to claim 10, wherein:
the evaluation of whether the RAN can support the adjustment of the at least one QoS profile is based on aperiodic or periodic monitoring of a real-time actual or expected radio resource quality, a traffic load, and/or a resource availability for the at least one QoS profile based on the obtained assistance information.

13. The RAN entity according to claim 10, wherein:
the evaluation of whether the RAN can support the adjustment of the at least one QoS profile is triggered by a handover or by a handover request message.

14. The RAN entity according to claim 10, wherein:
the evaluation of whether the RAN can support the adjustment of the at least one QoS profile is a radio resource control (RRC) functionality or a radio resource management (RRM) functionality.

15. The RAN entity according to claim 1, wherein the RAN entity is further configured to:
not perform the adjustment from the first QoS profile to the second QoS profile itself; and
provide the request to the CN entity.

16. The RAN entity according to claim 15, wherein:
the request comprises a result of an evaluation.

17. The RAN entity according to claim 1, wherein:
the assistance information is obtained from a network entity and/or a network management entity and/or an application entity.

18. The RAN entity according to claim 1, wherein the request or the QoS information comprises at least one of:
an indication of whether the at least one QoS profile has been changed;
a new or a potential or a desired QoS profile based on the adjustment of the at least one QoS flow;
cost information; or
a priority of the adjustment of the at least one QoS profile.

19. An entity for a support of adjusting quality of service (QoS) of at least one QoS flow in a radio access network (RAN), the entity comprising:
a memory; and
a processor coupled to the memory; wherein the processor is configured to:
provide, to a RAN entity, assistance information for an adjustment of at least one QoS profile for the at least one QoS flow of at least one wireless communication device,
wherein the RAN entity determines, based on the assistance information, whether to:
send a request for the adjustment for the at least one QoS profile for the at least one QoS flow, or
perform the adjustment of the at least one QoS profile for the at least one QoS flow;
based on determining to perform the adjustment of the at least one QoS profile, receive, from the RAN entity, QoS information based on the assistance information; and
based on determining to send the request for the adjustment, obtain the request for the adjustment of at least one QoS profile,
wherein the adjustment comprises changing the at least one QoS profile from a first QoS profile to a second QoS profile of a first QoS flow, and
wherein the request or the QoS information is based on the assistance information.

20. The entity according to claim 19, wherein the entity is a network entity, a network management entity, or an application entity.

21. A method for adjusting quality of service (QOS) of at least one QoS flow in a radio access network (RAN), the method comprising:
obtaining assistance information for an adjustment of at least one QoS profile for the at least one QoS flow of at least one wireless communication device;
based on obtaining the assistance information, determining whether to:
send a request for the adjustment for the at least one QoS profile for the at least one QoS flow, or
perform the adjustment of the at least one QoS profile for the at least one QoS flow based on the assistance information;
based on determining to send the request for the adjustment, providing, to a core network (CN) entity, the request for the adjustment based on the assistance information; and
based on determining to perform the adjustment of the at least one QoS profile for the at least one QoS flow, performing the adjustment and send QoS information to the CN entity,
wherein the QoS information is based on the assistance information, and
wherein the adjustment comprises changing the at least one QoS profile from a first QoS profile to a second QoS profile.

22. A non-transitory computer readable medium comprising a computer program, wherein when the computer program runs on a computer, the computer performs the method according to claim 21.

* * * * *

UNITED STATES PATENT AND TRADEMARK OFFICE
CERTIFICATE OF CORRECTION

PATENT NO. : 12,185,156 B2
APPLICATION NO. : 17/590595
DATED : December 31, 2024
INVENTOR(S) : Wei et al.

Page 1 of 1

It is certified that error appears in the above-identified patent and that said Letters Patent is hereby corrected as shown below:

In the Claims

Claim 1: Column 27, Line 56: "quality of service (QOS) of at least one QoS flow in a RAN," should read as -- quality of service (QoS) of at least one QoS flow in a RAN, --.

Claim 2: Column 28, Line 23: "profile of a second QOS flow, wherein the further" should read as -- profile of a second QoS flow, wherein the further --.

Claim 21: Column 30, Line 28: "A method for adjusting quality of service (QOS) of at" should read as -- A method for adjusting quality of service (QoS) of at --.

Signed and Sealed this
Seventeenth Day of June, 2025

Coke Morgan Stewart
*Acting Director of the United States Patent and Trademark Office*